Feb. 23, 1971  JAMES E. WEBB  3,565,719
ADMINISTRATOR OF THE NATIONAL AERONAUTICS
AND SPACE ADMINISTRATION
SOLAR PANEL FABRICATION
Filed May 17, 1967  2 Sheets—Sheet 1
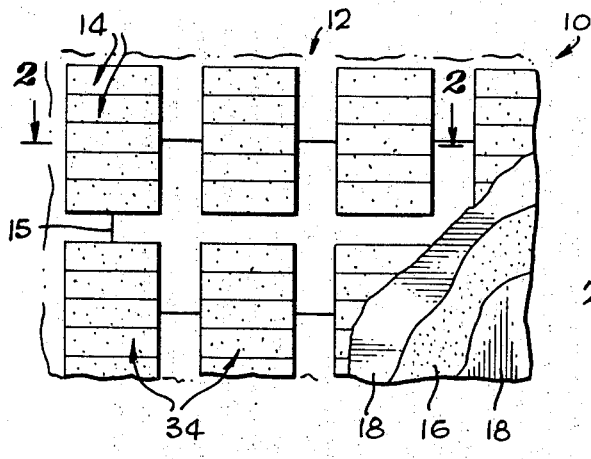
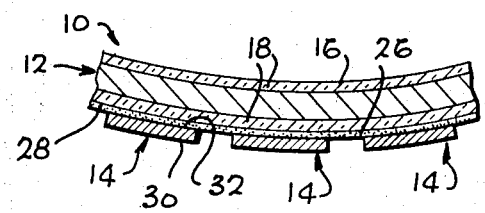
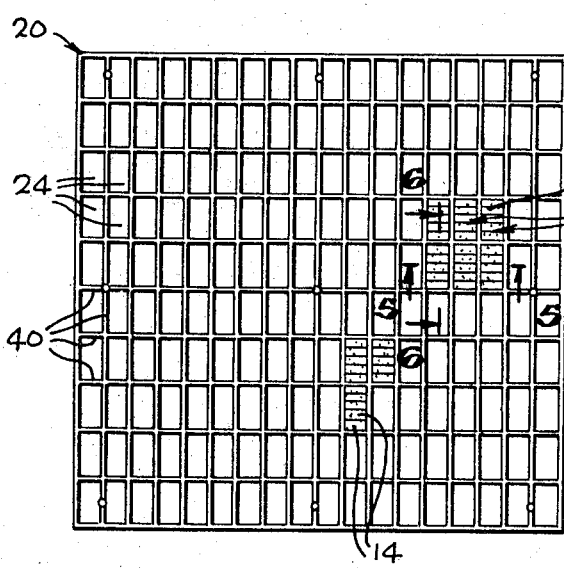
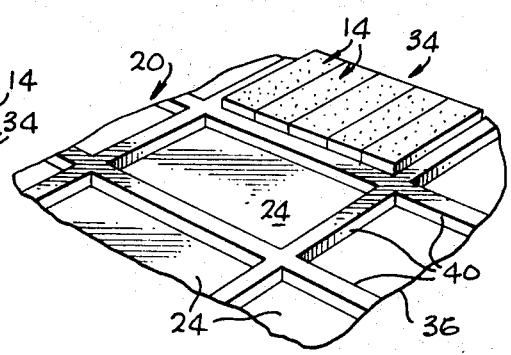
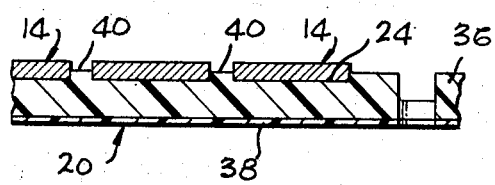
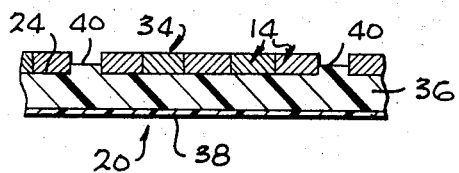
INVENTOR.
PRESTON S. DuPONT
BY *G. H. McCoy*
*Howard B. Scheckman*
ATTORNEYS Feb. 23, 1971          JAMES E. WEBB          3,565,719
ADMINISTRATOR OF THE NATIONAL AERONAUTICS
AND SPACE ADMINISTRATION
SOLAR PANEL FABRICATION
Filed May 17, 1967                                              2 Sheets-Sheet 2
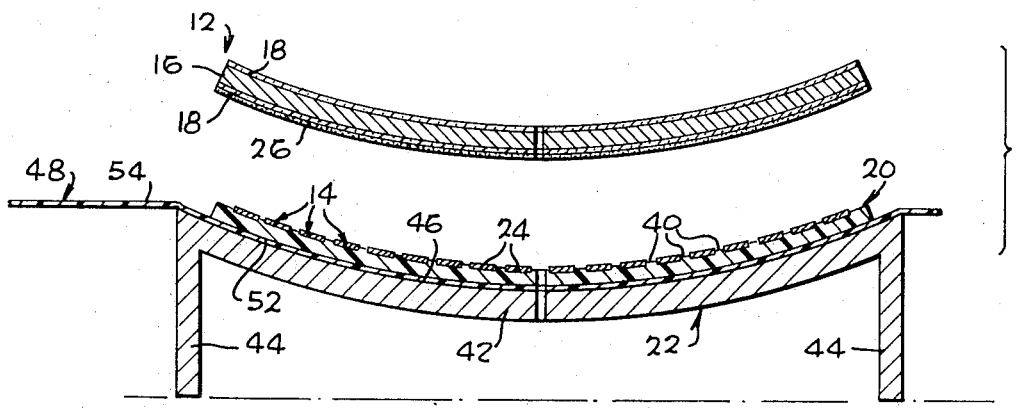
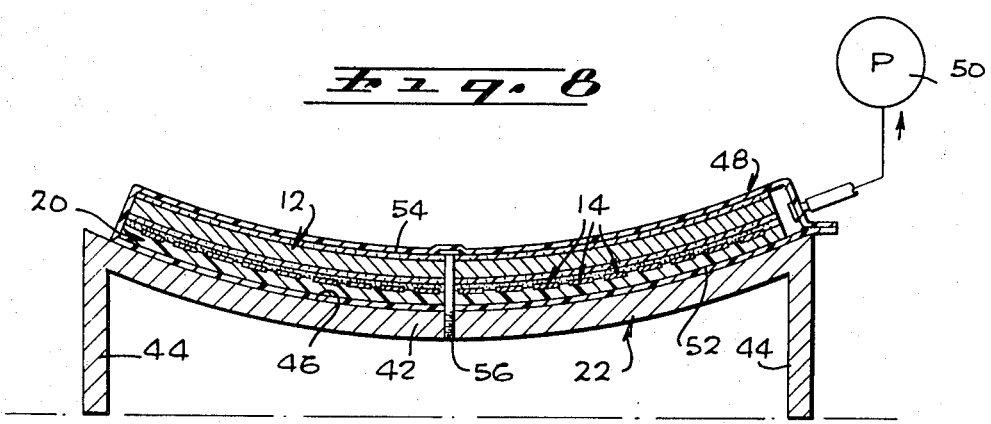
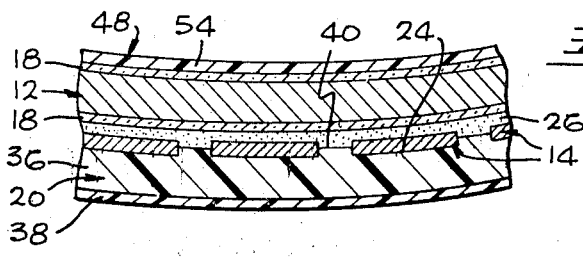
INVENTOR.
PRESTON S. DuPONT
BY
Howard B. Scheckman
ATTORNEYS

Header omitted

3,565,719
SOLAR PANEL FABRICATION

James E. Webb, Administrator of the National Aeronautics and Space Administration, with respect to an invention of Preston S. Du Pont, Northridge, Calif.
Filed May 17, 1967, Ser. No. 640,456
Int. Cl. B29c 17/04
U.S. Cl. 156—212　　　　　　　　　　　　　　6 Claims

ABSTRACT OF THE DISCLOSURE

This disclosure teaches how to precisely fabricate solar cells on a substrate. It teaches mounting solar cells face down in a flexible mat. The mat is then bent to the configuration the cells will have in final assembled form, and then a substrate is bonded to the backs of all the solar cells at one time.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates generally to solar panels. More particularly, the invention relates to an improved method of and apparatus for fabricating solar panels.

Solar panels are commonly employed as a source of electrical power in space vehicles. A great variety of solar panels have been devised. Generally speaking, however, a solar panel consists of a supporting base or substrate, a number of individual solar cells affixed to the substrate, and electrical wiring connecting the cells in such a way as to form a series-parallel solar cell array or matrix capable of generating electrical power of the desired voltage and current ratings when the panel is exposed to sunlight. It is well recognized that all space vehicle components, including solar panels, are required to be extremely reliable in operation. In the case of solar panels, one of the major requisites to such high reliability involves precise alignment of the solar cells on and firm attachment of the cells to the panel substrate. Precise alignment of the solar cells is essential to reliable wiring of the panels. Firm attachment of the cells to the supporting substrate, obviously, is essential to prevent loosening of the cells and/or failure of the electrical joints between the cells and panel wiring under the severe shock and acceleration forces encountered during launching and flight of space vehicles. Moreover, solar panels must conform precisely to a predetermined curvature or contour which is determined by the shape of the space vehicle on which the panels are to be installed.

It is a general object of the present inventiton to provide an improved method of and apparatus for fabricating solar panels with such precise solar cell alignment and firm solar cell attachment to the panel substrate.

Another object of the invention is to provide a solar panel fabrication method and apparatus of the character described which are relatively simple and economical in practice and construction, well adapted to mass production methods, and capable of producing solar panels of any desired contour or curvature.

Other objects, advantages and features of the invention will become evident as the description proceeds.

With these and such other objects in view, the invention consists in the construction, arrangement, and combination of the various parts of the invention whereby the objects contemplated are attained, as hereinafter set forth, pointed out in the appended claims, and illustrated in the accompanying drawings in which:

FIG. 1 is a fragmentary plan view, partly broken away, of a completed solar panel which has been constructed in accordance with the present invention;

FIG. 2 is an enlarged section taken on line 2—2 in FIG. 1;

FIG. 3 is a plan view of a solar cell pre-alignment fixture or mat which constitutes one element of the present solar panel fabrication apparatus and is utilized in the present solar panel fabrication method to achieve precise pre-alignment of the solar cells prior to attachment of the cells to the solar panel substrate;

FIG. 4 is an enlarged fragmentary perspective view of the solar cell pre-alignment mat illustrated in FIG. 3, showing a number of solar cells in position on the mat;

FIG. 5 is an enlarged sectiton taken on line 5—5 in FIG. 3;

FIG. 6 is an enlarged section taken on line 6—6 in FIG. 3;

FIG. 7 depicts an initial step of the present solar panel fabrication method and illustrates, in vertical section, a pre-alignment fixture or mat support which constitutes another element of the present solar panel fabrication apparatus;

FIG. 8 is a view similar to FIG. 7 depicting a subsequent step of the present solar panel fabrication method; and FIG. 9 is an enlarged fragmentary section illustrating the solar cell pre-alignment mat, solar cells, and solar panel substrate in the adhesive bonding relationship which these parts occupy in FIG. 8.

Generally speaking, the present invention provides a method of and apparatus for fabricating a solar panel 10 having a supporting base or substrate 12 which forms the main body of the panel, a number of solar cells 14 adhesively bonded to one surface of the substrate, and wiring 15 electrically connecting the cells to form a series-parallel solar cell array or matrix capable of generating electrical power of the desired voltage and current ratings in response to exposure of the cells to sunlight.

Panel substrate 12 is provided with a contour that may vary, depending upon the particular application of the solar panel, and is determined by the shape of the space vehicle on which the panel is to be installed.

The solar panel 10 which has been selected for illustration in the drawings, for example, is cylindrically curved and is intended to be installed with other similar panels about a generally cylindrical space satellite, such as the SYNCOM satellite, to provide a cylindrical solar cell array about the full circumference of the satellite. As will appear from the ensuing description, however, the present invention may be employed to fabricate solar panels of any shape. Accordingly, the illustrated cylindrical panel shape should be regarded as purely illustrative in nature. The present solar panel fabrication technique does not require any particular panel substrate construction. A preferred panel substrate for use in the invention, however, will comprise an aluminum honeycomb core 16 surfaced with fiber glass facing sheets 18 which are adhesively bonded to opposite sides of the core, as best illustrated in FIG. 2.

Stated generally, the present method of fabricating a solar panel involves initial preparation or selection of a relatively rigid panel substrate 12 having a curvature or contour conforming to the desired curvature or contour of the completed panel, initial precise prealignment of the solar cells 14 on a supporting surface having a curvature or contour at least approximating that of the substrate surface to which the cells are to be secured, whereby the mounting surfaces of the cells will conform approximately to the cell mounting surface of the substrate, and subsequent adhesive bonding of the cells to the substrate by bringing the cell mounting surface of the substrate into adhesive bonding relation while the adhesive bonding medium is cured or set to its final bonding state.

The apparatus of the invention is uniquely constructed and arranged to facilitate practice of the solar panel fabricating technique outlined above. Stated generally, this apparatus comprises a solar cell prealignment fixture 20 for locating the solar cells 14 in their precise prealignment and a support 22 for supporting the fixture and the cells in an initial bonding position, wherein the mounting surfaces of the cells conform to the contour of the cell mounting surface on the solar panel substrate 12, as described above. According to the preferred practice of the invention, the solar cell prealignment fixture 20 comprises a flexible mat which defines a number of cavities 24 for receiving the solar cells 14 and positively locating the latter in their precise prealignment. The fixture mat is flexible to permit placement of the cells in the mat cavities while the mat is supported in a flat condition. The mat containing the cells is then placed on the support 22 in such a way that the mat assumes the contour or curvature of the mat supporting surface of the support. According to the present invention, this supporting surface contour is made to conform approximately to that of the solar cell mounting surface of the solar panel substrate 12. For reasons which will be explained presently, the radius of curvature of the illustrated mat support 22 is made slightly greater than the radius of curvature of the cell mounting surface of the panel substrate. In the illustrated practice of the invention, the panel substrate 12 is adhesively bonded to the solar cells 14 while these cells are contained by the alignment fixture or mat 20 and the latter is located on the support 22. After setting of the adhesive 26, the mat is removed from the then completed solar panel 10.

Referring now in greater detail to the drawings, it will be recalled that the substrate 12 of the illustrated solar panel 10 includes a central aluminum honeycomb core 16 and outer fiber glass facing layers 18 adhesively bonded to the core. During preparation or fabrication of the substrate, the core 16 is formed to the desired curvature or contour which, in this instance, is a cylindrical curvature. The solar cells 14 are to be bonded, by the adhesive 26, to the convex surface 28 of the substrate. This surface is referred to herein as the cell mounting surface of the substrate. The solar cells 14 are conventional and thus need not be described in detail. Suffice it to say that each cell has a normally outer light sensitive surface 30, a normally inner conductive surface 32, and electrical terminals or pickups (not shown) attached to these surfaces for electrically connecting the cells to the panel wiring 15. In the completed solar panel 10 of FIGS. 1 and 2, the solar cells 14 are arranged in groups 34 of five cells each. The panel wiring 15 electrically connects the several cells in each cell group, and the several cell groups, in such a way as to form a series-parallel solar cell matrix or array capable of generating electrical power of the desired voltage and current ratings. This wiring is conventional and need not be explained in detail.

The solar cell prealignment fixture or mat 20 may be constructed in various ways and of various materials. Preferably, however, the mat comprises a molded silastic mat body 36 composed of a plastic known as Sylgard 182 reinforced with mascerated glass fibers and dimensionally stiffened by a fiber glass facing layer 38 bonded to the normally undersurface of the body. This mat body material is preferred because of its dimensional stability, molding capability, flexibility, and its compatability with common solar cell and cover slide materials. The mat body 36 is molded with upstanding ribs 40 on its normally upper surface which conform to a rectangular grid system and define therebetween the solar cell receiving cavities 24. These cavities are dimensioned to snugly receive the solar cell groups 34 and are relatively disposed to locate the cells in the precise alignment which the cells are to occupy on the completed solar panel 10. It is significant to note at this point that the depth of the mat cavities 24 is somewhat less than the thickness of the solar cells 14. Accordingly, when the cells are positioned in the cavities, the upper surfaces of these cells project a distance above the upper surfaces of the mat ribs 40. The solar cells are placed in the cavities with the normally outer light sensitive surfaces 30 of the cells facing the bottom walls of the cavities. The cell surfaces which are uppermost and project above the upper surfaces of the mat ribs 40, therefore, are the normally inner cell surfaces 32. The depth of the several cavities is the same, whereby when the cavities are filled with solar cells, the upper exposed surfaces 32 on all of the cells are located substantially in a common plane.

The mat support 22 may be constructed in various ways. The illustrated support comprises an upper wall or plate 42 and upright side walls or legs 44 which depend from the longitudinal side edges of the plate. The upper surface 46 of the support plate 42 has a curvature or contour conforming approximately to that of the cell mounting surface 28 of the solar panel substrate 12. In the present instance, therefore, the supporting surface 46 is cylindrically curved. As noted earlier, and as will be presently explained, the radius of curvature of the surface 46 is preferably slightly greater than the substrate cell mounting surface.

According to the illustrative solar panel fabrication practice of the invention, the solar cells 14 are placed in the cavities 24 of the cell prealignment mat 20 with their normally inner surfaces 32 uppermost and the mat is placed on the support 22. Being flexible, the mat conforms to the curvature of the curved support surface 46 and thus assumes a curvature or contour approximating that of the solar panel substrate cell mounting surface 28. The solar cell surfaces 32 thus also conform approximately to this cell mounting surface. According to the preferred practice of the invention, the mat is initially placed on a flat surface during placement of the solar cells in the mat cavities 24 to permit insertion of the cells into the cavities with maximum ease and accuracy. Thereafter, the mat, with its contained solar cells, is placed on the curved support surface 46. This avoids interference between the adjacent cells and between the cells and mat ribs 40 as may occur if the cells are placed in the mat cavities while the mat is located on the curved support. However, this latter practice is also considered to be within the scope of the invention. In some cases, the support plate 42 on which the mat is placed may be made flexible to permit this plate to initially support the mat in a flat condition during insertion of the solar cells and subsequent deformation of the plate to its illustrated curvature.

The next step of the illustrated inventive practice involves adhesive bonding of the solar panel substrate 12 to the solar cells 14 while the latter are retained in their initial precise prealignment by the mat 20 which is now located on the curved support surface 46. This may be accomplished by coating the cell mounting surface 28 of the panel substrate with a suitable adhesive 26, lowering the substrate into adhesive bonding relation with the upper exposed surfaces 32 of the solar cells, and then applying a clamping pressure to retain the substrate and cells in firm contact while the adhesive is cured or set. In the drawings, this clamping pressure is applied by enclosing the substrate 12, and the prealignment mat 20 with its contained solar cells 14 in a vacuum envelope or bag 48 and then evacuating the bag with the aid of a vacuum pump 50, or the like. This vacuum bag may be constructed to have bottom and top flaps 52, 54 which may be separated, as shown in FIG. 7, to receive the mat and panel substrate and permit initial bonding engagement of the substrate with the solar cells, and then sealed to another about their edges, as shown in FIG. 8, thus to enable the bag to be evacuated. A clamping pressure on the order of 5 p.s.i. has been found to produce an efficient adhesive bond between the solar cells and the panel substrate. After the adhesive 26 has set, the vacuum bag 48 is reopened and the mat 20 is removed from the then completed solar panel 10.

It is obvious that precise alignment of the solar cells 14 on the completed solar panel 10 requires not only precise prealignment of the cells relative to one another, which function is performed by the mat 20, but also precise alignment of the mat relative to the panel substrate 12. This latter alignment function is accomplished by locating pins 56 which extend through the substrate and mat, as shown in FIG. 8. Moreover, in order to assure proper bonding contact of the substrate with all of the solar cells, it is necessary to accurately register the mat and substrate relative to the curved mat supporting surface 46. To this end, the locating pins 56 extend into the support plate 42, as illustrated. Obviously, the locating pins may be situated in various positions. Preferably, however, the pins are located on the transverse centerlines of the panel substrate 12, mat 20, and support plate 42, in the manner illustrated. It is significant to recall in connection with this placement of the locating pins that the radius of curvature of the supporting plate 42 is slightly greater than that of the substrate cell mounting surface 28. This arrangement permits adhesive bonding of the panel substrate 12 to the solar cells 14 with maximum precision by first engaging the substrate with the cells along the transverse centerline of the substrate and then bringing the cells and substrate into adhesive bonding contact at opposite sides of the centerline.

As noted earlier, while the invention has been disclosed in connection with the fabrication of a cylindrically curved solar panel, the basic fabricating technique of the invention may be employed to produce solar panels of any desired curvature or contour. Also, while a relatively rigid substrate is described, it will be apparent to those skilled in the art that a semi-rigid substrate may also be used, as, for example, Teflon impregnated with fiber glass.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention; therefore, it is intended that the invention be limited only as indicated by the scope of the following claims.

What I claim is:
1. The method of fabricating a solar panel including a relatively rigid supporting substrate and a plurality of solar cells secured to one surface of said substrate comprising the steps of:
  prealigning said cells by inserting the cells into cell-receiving cavities formed in a flexible cell prealignment mat while the mat is supported in a substantially planar condition and subsequently supporting the mat on a supporting surface whose contour approximates that of said substrate surface so that the contour of the mat is caused to conform approximately to the contour of said substrate; and
  adhesively bonding said cells and substrate to one another by bringing said substrate surface into adhesive bonding relation with said cells while said mat is supported on said supporting surface.

2. The method according to claim 1 wherein said cells are arranged in spaced prealigned groups of adjacent cells.

3. The method according to claim 1 wherein said substrate surface is curved and said supporting surface is curved to conform approximately to the curvature of said substrate surface.

4. The method according to claim 3 wherein:
  said substrate surface and said supporting surface are cylindrically curved;
  the radius of curvature of said supporting surface is slightly greater than the radius of curvature of said substrate surface; and
  said adhesive bonding step involves initial engagement of said substrate with the cells located approximately along the transverse centerline of said substrate and subsequent engagement of said substrate with the remaining cells at opposite sides of said centerline.

5. A method of fabricating a solar panel including a relatively rigid, cylindrically configured substrate having a cylindrically curved surface and a plurality of solar cells secured to said surface comprising the steps of:
  supporting the cells in prealigned positions on a cylindrically curved supporting surface having a radius of curvature slightly greater than the radius of curvature of said substrate surface; and
  adhesively bonding said cells and said substrate surface to one another by bringing said substrate surface into an adhesive bonding engagement with said plurality of cells while said cells are supported in a prealigned position on said supporting surface.

6. The method of claim 5 wherein as said plurality of cells and said substrate surface are brought into bonding engagement initial engagement of the substrate surface with the cells is caused to occur approximately along a transverse center line of said substrate, while subsequent engagement of said cells and substrate surface is caused to occur at opposite sides of said centerline.

References Cited

UNITED STATES PATENTS

| | | | |
|---|---|---|---|
| 2,342,988 | 2/1944 | Vidal | 156—213 |
| 2,989,575 | 6/1961 | Wallace | 136—89 |
| 3,067,082 | 12/1962 | Leigh | 156—213X |
| 3,113,900 | 12/1963 | Abernethy et al. | 156—560X |
| 3,158,927 | 12/1964 | Saunders | 29—577 |
| 3,436,201 | 4/1969 | Tsuji et al. | 29—589X |

JOHN F. CAMPBELL, Primary Examiner

W. TUPMAN, Assistant Examiner

U.S. Cl. X.R.

29—589; 136—89; 156—475